United States Patent
Koo et al.

(10) Patent No.: US 11,228,719 B2
(45) Date of Patent: Jan. 18, 2022

(54) LIGHTING CONTROL APPARATUS AND METHOD THEREOF

(71) Applicant: Hanwha Techwin Co., Ltd., Seongnam-si (KR)

(72) Inventors: Won Mo Koo, Seongnam-si (KR); Hee Joong Han, Seongnam-si (KR); Won Sin Lee, Seongnam-si (KR); Jong In Park, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 41 days.

(21) Appl. No.: 15/992,947

(22) Filed: May 30, 2018

(65) Prior Publication Data

US 2019/0215431 A1 Jul. 11, 2019

(30) Foreign Application Priority Data

Jan. 9, 2018 (KR) .................. 10-2018-0002880

(51) Int. Cl.
  *H04N 5/235* (2006.01)
  *H04N 5/232* (2006.01)
  *H04N 5/225* (2006.01)

(52) U.S. Cl.
  CPC ......... *H04N 5/2354* (2013.01); *H04N 5/2256* (2013.01); *H04N 5/2351* (2013.01); *H04N 5/23296* (2013.01)

(58) Field of Classification Search
  CPC ............... H04N 5/2354; H04N 5/2256; H04N 5/23296; H04N 5/2351
  See application file for complete search history.

(56) References Cited

U.S. PATENT DOCUMENTS

| 8,885,095 B2 | 11/2014 | Kim et al. | |
|---|---|---|---|
| 2004/0119878 A1* | 6/2004 | Okamura | H04N 5/23296 348/371 |
| 2006/0165399 A1* | 7/2006 | Feng | G03B 7/00 396/61 |
| 2008/0074380 A1* | 3/2008 | Owyeung | H04N 5/2354 345/102 |
| 2008/0106637 A1* | 5/2008 | Nakao | H04N 5/2256 348/371 |

(Continued)

FOREIGN PATENT DOCUMENTS

| KR | 10-0551424 B1 | 2/2006 |
|---|---|---|
| KR | 10-0588205 B1 | 6/2006 |

(Continued)

*Primary Examiner* — Lin Ye
*Assistant Examiner* — Tuan H Le
(74) *Attorney, Agent, or Firm* — Sughrue Mion, PLLC

(57) ABSTRACT

A method of controlling zoom of a lighting unit based on brightness of an image may include determining at least one of an angle of view of an optical unit and an optical zoom magnification of the optical unit configured to obtain an image by using an image sensor, determining a zoom adjustment range of a lighting unit based on at least one of the angle of view and the optical zoom magnification, and adjusting zoom of the lighting unit such that brightness of the image meets a preset condition within the zoom adjustment range, wherein a diffusion range of light from the lighting unit is adjusted through the zoom adjustment of the lighting unit.

19 Claims, 7 Drawing Sheets

(56) References Cited

U.S. PATENT DOCUMENTS

| | | | | |
|---|---|---|---|---|
| 2012/0104226 A1* | 5/2012 | Roth | ................ | G06K 7/10732 |
| | | | | 250/205 |
| 2013/0128096 A1* | 5/2013 | Kim | ...................... | G02B 15/14 |
| | | | | 348/345 |
| 2017/0289423 A1* | 10/2017 | Yamamoto | ........... | H04N 5/2354 |
| 2018/0176486 A1* | 6/2018 | Kadowaki | ............... | F21V 14/02 |

FOREIGN PATENT DOCUMENTS

| | | |
|---|---|---|
| KR | 10-0856291 B1 | 9/2008 |
| KR | 10-1042895 B1 | 6/2011 |
| KR | 10-1289797 B1 | 7/2013 |
| KR | 10-1412189 B1 | 6/2014 |
| KR | 10-2016-0123166 B1 | 10/2016 |

* cited by examiner

LIGHTING CONTROL APPARATUS AND METHOD THEREOF

CROSS-REFERENCE TO THE RELATED APPLICATION

This application claims the priority from Korean Patent Application No. 10-2018-0002880, filed on Jan. 9, 2018 in the Korean Intellectual Property Office, the disclosure of which is incorporated herein in its entirety by reference.

BACKGROUND

1. Field

One or more example embodiments relate to a lighting control method and an apparatus, and a computer program, and more particularly, to a method, an apparatus, and a computer program of controlling zoom of a lighting based on at least one of an angle of view of an image and brightness of an image.

2. Description of the Related Art

With the development of information and communication technology, installation of surveillance cameras in a residential area, a commercial site such as department stores and banks, a factory site, etc. is increasing.

Since these surveillance cameras are installed in an environment in which ambient light changes, a lighting unit needs to be controlled depending on a change of the ambient light.

Also, for a more efficient operation of a surveillance camera, an optical zoom may be mounted on the surveillance camera. In this case, when an angle of view of an image being captured through a zooming operation of the surveillance camera changes, brightness of a lighting unit may need to be adjusted depending on the changed angle of view.

SUMMARY

One or more example embodiments relate to controlling a lighting depending on ambient light and an angle of view.

One or more example embodiments relate to obtaining an image of a predetermined brightness under various environments through control of a lighting.

One or more example embodiments provide methods to improve or overcome disadvantages such as saturation of a screen and non-identification of a reflector occurring when a lighting is used.

According to an aspect of an example embodiment, there is provided a method of controlling a zoom of a lighting unit, the method including determining at least one of an angle of view of an optical unit and optical zoom magnification of the optical unit, the optical unit configured to obtain an image by an image sensor, determining a zoom adjustment range of the lighting unit based on at least one of the angle of view and the optical zoom magnification, and adjusting the zoom of the lighting unit, within the determined zoom adjustment range, such that brightness of the image meets a preset condition, wherein a diffusion range of light emitted from the lighting unit is adjusted based on the adjusted zoom of the lighting unit.

The determining of the zoom adjustment range may further include determining the zoom adjustment range such that a range corresponding to at least one of the angle of view and the optical zoom magnification is equal to a minimum diffusion range of the diffusion range of the light.

The adjusting of the zoom may further include determining whether the brightness of the image meets the preset condition while adjusting the zoom of the lighting unit by increasing the diffusion range of the light from the minimum diffusion range.

The preset condition may be a condition in which the brightness of the image is equal to or higher than a preset minimum brightness, and less than a preset maximum brightness.

The method may further include, before the adjusting of the zoom, adjusting a first zoom of the lighting unit such that the diffusion range of the light is equal to a range corresponding to at least one of the angle of view and the optical zoom magnification.

The adjusting of the zoom may further include determining whether the brightness of the image is less than a preset minimum brightness when the zoom of the lighting unit is adjusted such that the diffusion range of the light is equal to the range corresponding to the at least one of the angle of view and the optical zoom magnification, and when the brightness of the image is determined to be less than the preset minimum brightness, controlling the lighting unit to increase the brightness of light from the lighting unit.

The controlling of the lighting unit to increase the brightness of light from the lighting unit may include at least one of controlling the lighting unit to increase power supplied to the lighting unit, and controlling the lighting unit to increase power supplied to at least one second lighting unit adjacent to the lighting unit.

The determining of the at least one of the angle of view of the optical unit and the optical zoom magnification of the optical unit may include determining a location of at least one optical lens included in the optical unit, and the determining of the zoom adjustment range includes determining the zoom adjustment range of the lighting unit based on the location of the at least one optical lens.

The lighting unit may include at least one lighting lens configured to adjust the diffusion range of the light, and the determining of the zoom adjustment range may further include determining a movement range of the lighting lens based on the zoom adjustment range determined based on the location of the at least one optical lens.

A non-transitory computer recording medium having recorded thereon a computer program may execute the method.

According to an aspect of an example embodiment, there is provided a method of controlling a zoom of a lighting unit, the method including determining a first zoom value of the lighting unit based on an angle of view of an optical unit configured to obtain an image by an image sensor, determining a second zoom value of the lighting unit such that a brightness of the image meets a preset condition, and adjusting the zoom of the lighting unit based on at least one of the first zoom value and the second zoom value, wherein a diffusion range of light emitted from the lighting unit is adjusted corresponding to the adjusted zoom of the lighting unit.

The determining of the first zoom value may include determining the angle of view of the optical unit based on a location of at least one optical lens included in the optical unit.

The determining of the second zoom value may include determining whether the brightness the image obtained by the image sensor meets the preset condition.

The determining of the second zoom value may further include determining whether the brightness of the image meets the preset condition when the zoom of the lighting unit is adjusted based on the first zoom value, and determining a zoom value neighboring the first zoom value as the second zoom value based on the determination that the brightness of the image meets the preset condition.

The method may further include, after the determining of the first zoom value, adjusting the zoom of the lighting unit by moving a lighting lens included in the light unit from a first position corresponding to the first zoom value.

The method may further include determining a second position of the lighting lens based on the determination that the brightness of the image meets the preset condition, determining the second zoom value based on the second position, and adjusting the zoom of the lighting unit based on the determined second zoom value.

The preset condition may be a condition in which the brightness of the image is equal to or higher than a preset minimum brightness, and less than a preset maximum brightness.

According to an aspect of an example embodiment, there is provided a lighting apparatus including an optical unit configured to obtain an image and determine at least one of an angle of view of the optical unit and optical zoom magnification of the optical unit, a controller configured to determine a zoom adjustment range of the lighting apparatus based on at least one of the angle of view and the optical zoom magnification, and a lighting lens configured to adjust the zoom of the lighting apparatus, within the determined zoom adjustment range, such that brightness of the image meets a preset condition, wherein a diffusion range of light emitted from the lighting apparatus is adjusted based on the adjusted zoom of the lighting apparatus.

The controller may be further configured to determine the zoom adjustment range such that a range corresponding to at least one of the angle of view and the optical zoom magnification is equal to a minimum diffusion range of the diffusion range of the light, and determine whether the brightness of the image meets the preset condition while adjusting the zoom of the lighting apparatus by increasing the diffusion range of the light from the minimum diffusion range.

The preset condition may be a condition in which the brightness of the image is equal to or higher than a preset minimum brightness, and less than a preset maximum brightness.

BRIEF DESCRIPTION OF THE DRAWINGS

The above and other aspects will become apparent and more readily appreciated from the following description of the example embodiments, taken in conjunction with the accompanying drawings in which.

DETAILED DESCRIPTION

Figure 1:
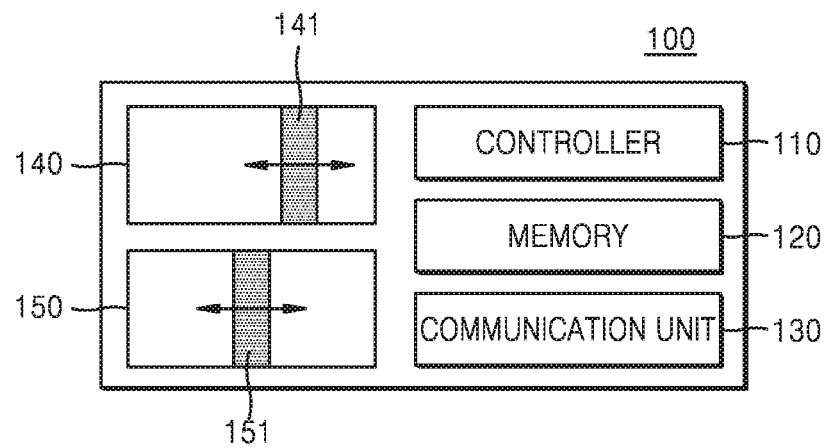
FIG. 1 is a block diagram of a lighting controller according to an example embodiment.

As the disclosure allows for various changes and numerous example embodiments, examples will be illustrated in the accompanying drawings and described in detail in the written description. An effect and a characteristic of the disclosure, and a method of accomplishing these will be apparent when referring to example embodiments described with reference to the drawings. This disclosure may, however, be embodied in many different forms and should not be construed as limited to the example embodiments set forth herein.

Hereinafter, the disclosure will be described more fully with reference to the accompanying drawings, in which example embodiments of the disclosure are shown. When description is made with reference to the drawings, like reference numerals in the drawings denote like or corresponding elements, and repeated description thereof will be omitted.

It will be understood that although the terms "first", "second", etc. may be used herein to describe various components, these components should not be limited by these terms. These components are only used to distinguish one component from another. It will be further understood that the terms "comprises" and/or "comprising" used herein specify the presence of stated features or components, but do not preclude the presence or addition of one or more other features or components.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Sizes of elements in the drawings may be exaggerated for convenience of explanation. In other words, since sizes and thicknesses of components in the drawings are arbitrarily illustrated for convenience of explanation, the following example embodiments are not limited thereto.

According to an example embodiment, a lighting may be controlled depending on ambient light and an angle of view. Also, an image having a predetermined brightness may be obtained under various environments by controlling a lighting. Furthermore, disadvantages such as saturation of a screen and non-identification of a reflector occurring when a lighting is used may be reduced or overcome.

FIG. 1 is a block diagram of a lighting controller 100 according to an example embodiment.

The lighting controller 100 may control zoom of a lighting unit based on brightness of an image. For this purpose, as illustrated in FIG. 1, the lighting controller 100 may include a controller 110, a memory 120, a communication unit 130, an optical unit 140, and a lighting unit 150.

The controller 110 according to an example embodiment may control zoom of the lighting unit 150 based on brightness of an image. In this case, the controller 110 may include various apparatuses capable of processing data such as a processor. Here, the processor may include a data processor having a physically structurized circuit configured to perform a function expressed in terms of, for example, codes or commands included in a program, and built in hardware. Though examples of the data processor built in hardware may include processors such as microprocessors, central processing units (CPUs), processor cores, multiprocessors, application-specific integrated circuits (ASICs), and field programmable gate arrays (FPGAs), it is not limited thereto.

The controller 110 may include a single processor, or a plurality of processors divided on a functional basis.

For example, the controller 110 may include one processor and/or one operator, determine an angle of view of the optical unit 140, determine a zoom adjustment range of the lighting unit 150, and adjust zoom of the lighting unit 150 such that brightness of an image meets a preset condition within the zoom adjustment range.

According to an example embodiment, the controller 110 may include an angle of view determining unit configured to determine an angle of view of the optical unit 140, a zoom adjustment range determining unit configured to determine the zoom adjustment range of the lighting unit 150, and a zoom adjustor configured to adjust zoom of the lighting unit 150 such that brightness of an image meets the preset condition within the zoom adjustment range. However, this is exemplary and example embodiments are not limited thereto.

The memory 120 according to an example embodiment stores temporarily or permanently data processed by the controller 110, instructions, programs, program codes, or a combination thereof. The memory 120 may include magnetic storage media or flash storage media, but is not limited thereto. The memory 120 may store temporarily or permanently not only data processed by the controller 110 and commands, but also an image obtained by the optical unit 140.

The communication unit 130 according to an example embodiment may be a unit including hardware and software required for transmitting/receiving a signal such as a control signal or a data signal to/from another network apparatus through wired/wireless connection. For example, the communication unit 130 may transmit an image obtained by the optical unit 140 to another network apparatus.

The optical unit 140 according to an example embodiment may be a unit configured to convert light, which is referred to as an image according to example embodiments, to an electric signal, and may include a lens and an image sensor.

The lens may be a lens group including one or more lenses. Also, the lens may include a plurality of lenses configured to change an angle of view of an image. In this case, a location of at least one of the plurality of lenses may be used to adjust zoom of the lighting unit, as described below.

Meanwhile, the image sensor may convert an image input through a lens to an electric signal. For example, the image sensor may be a semiconductor device which may convert an optical signal to an electric signal, that is, an image, such as a charge-coupled device (CCD) or a complementary metal oxide semiconductor (CMOS). However, this is exemplary and example embodiments are not limited thereto.

The image sensor may generate information regarding brightness of an image and provide the information to the controller 110. For example, the image sensor may generate information regarding brightness of an image as a gain, and provide the information to the controller 110.

The lighting unit 150 according to an example embodiment may emit light to a region captured by the optical unit 140 such that an image is obtained at a predetermined brightness by the optical unit 140. In this case, the lighting unit 150 may include a light source configured to convert electric energy to light energy, and a lens unit including one or more lenses whose distances from the light source vary. A diffusion range of light from the lighting unit 150 may be adjusted depending on movement of the lens unit, depending on the varying of the distance from the light source. In this case, the diffusion range of light may be a degree by which the light spreads in a direction different from an irradiation direction or a progression direction of the light, and may be, for example, a degree by which the light spreads on a plane perpendicular to the irradiation direction of the light.

When the diffusion range of light is wider, the intensity of the light emitted to a unit area by the lighting unit 150 may be weaker. When the diffusion range of the light is narrower, the intensity of the light emitted to a unit area by the lighting unit 150 may be stronger.

The lighting controller 100 may be an apparatus included in an image obtaining apparatus such as a surveillance camera, or may correspond to the image obtaining apparatus itself. In other words, the lighting controller 100 according to an example embodiment may be an image obtaining apparatus.

Hereinafter, a method in which the lighting controller 100 controls zoom of the lighting unit 150 depending on brightness of an image is described according to example embodiments.

Figure 2:
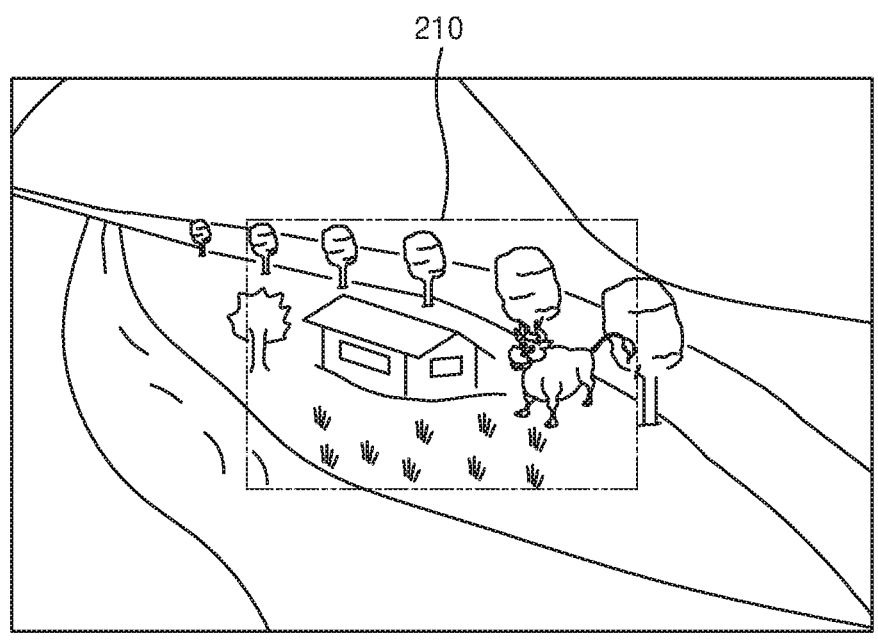
FIG. 2 is a view to illustrate an angle of view of an optical unit according to an example embodiment.
Figure 2:
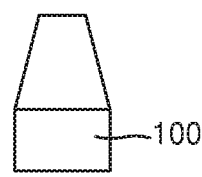

FIG. 2 is a view to illustrate an angle of view of the optical unit 140 according to an example embodiment.

According to an example embodiment, an angle of view 210 may be a range of a scene which may be obtained by the optical unit 140 of the lighting controller 100. Therefore, a wide angle of view may be a wider range of a scene which may be obtained by the optical unit 140. A narrow angle of view may be a narrower range of a scene which may be obtained by the optical unit 140.

The angle of view may be determined based on a location of at least one lens among a plurality of lenses included in the optical unit 140. In other words, the controller 110 according to an example embodiment may determine a location of the at least one lens among the plurality of lenses included in the optical unit 140, and determine an angle of view of the optical unit 140 based on the location of the at least one lens. In this case, corresponding information of an angle of view for each location of the lens may be obtained in advance and stored in the memory 120. Meanwhile, the controller 110 according to an example embodiment may determine the location of the at least one lens among the plurality of lenses included in the optical unit 140, and determine optical zoom magnification of the optical unit 140 based on this. In this case, the optical zoom magnification may be a ratio by which an image obtained by a lens of the optical unit 140 is enlarged. In this case, corresponding information of optical zoom magnification for each location of a lens may be obtained in advance and stored in the memory 120.

The controller 110 according to an example embodiment may determine a zoom adjustment range of the lighting unit 150 with reference to at least one of the angle of view and the optical zoom magnification of the optical unit 140 determined by the above process. In more detail, the controller 110 according to an example embodiment may determine a location of at least one optical lens included in the optical unit 140, and determine a zoom adjustment range of the lighting unit 150 based on the location of the at least one lens. In this case, the controller 110 according to an example embodiment may determine the zoom adjustment range such that a range corresponding to the at least one of the angle of view and the optical zoom magnification of the optical unit 140 becomes a minimum diffusion range of a diffusion range of light. For example, the controller 110 may determine a zoom adjustment range such that a minimum diffusion range of light is the same as the angle of view.

Figure 3A:
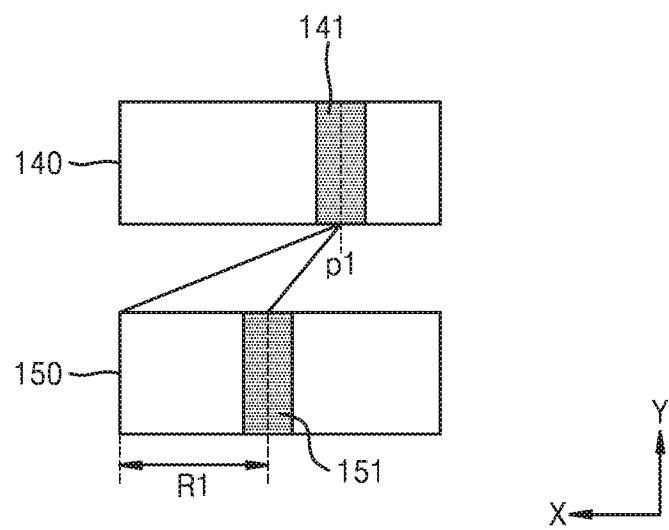
FIG. 3A, FIG. 3B, and FIG. 4 are views to illustrate a process in which a controller determines a zoom adjustment range of a lighting unit according to an example embodiment.
Figure 3B:
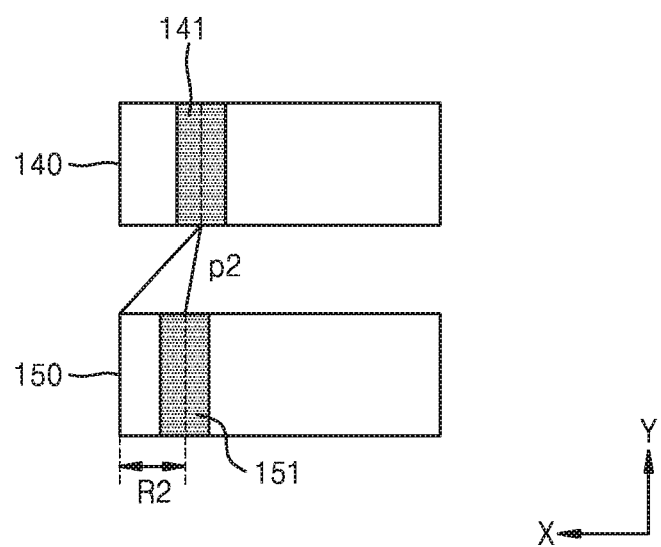
Figure 4:
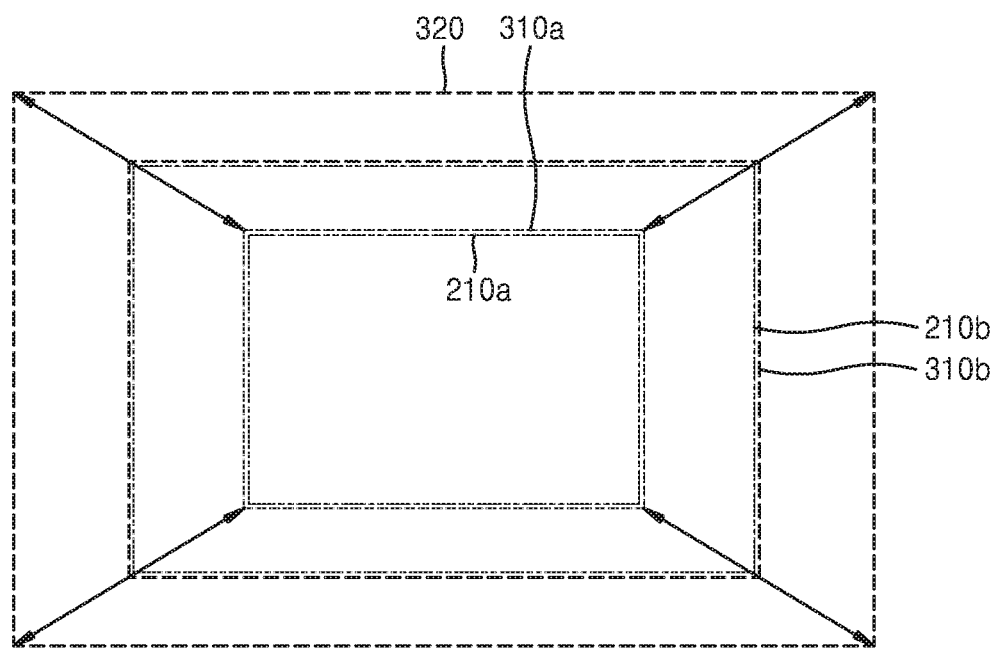

FIGS. 3A, 3B, and 4 are views to illustrate a process in which the controller 110 determines a zoom adjustment range of the lighting unit 150 according to an example embodiment.

Referring to FIGS. 3A, 3B, and 4, at least one of an angle of view and optical zoom magnification of the optical unit 140 may change depending on a location of an optical lens 141, and the lighting unit 150 may include a lighting lens 151 configured to adjust a diffusion range of light, and a diffusion range of light from the lighting unit 150 may be adjusted depending on a location of the lighting lens 151, where zoom adjustment of the lighting unit 150 may be based on movement of the lighting lens 151. Light from the lighting unit 150 may be emitted in a +X direction, and the optical unit 140 may obtain an image from the +X direction.

Referring to FIG. 3A assuming the above, the controller 110 according to an example embodiment may determine a location p1 of the optical lens 141 included in the optical unit 140, and determine a zoom adjustment range R1 of the lighting unit 150, that is, the zoom adjustment range R1 of the lighting lens 151, based on the location p1 of the optical lens 141. In other words, referring to FIG. 3A, the lighting lens 151 may move only within the zoom adjustment range R1 to adjust brightness of an image.

Referring to FIG. 4, in the case where the lighting lens 151 is located at a right end, that is, an extreme location in the −X direction, of the zoom adjustment range R1, a diffusion range 310a of light from the lighting unit 150 may coincide with an angle of view 210a. In the case where the lighting lens 151 is located at a left end, that is, an extreme location in the +X direction, of the zoom adjustment range R1, a diffusion range 320 of light from the lighting unit 150 may be wider than the angle of view 210a. As the diffusion range of light approaches the angle of view 210a, brightness of an image may increase, and as the diffusion range of light becomes larger than the angle of view 210a, brightness of an image may be reduced.

Meanwhile, referring to FIG. 3B, the controller 110 according to an example embodiment may determine a location p2 of the optical lens 141 included in the optical unit 140, and determine a zoom adjustment range R2 of the lighting unit 150, that is, the zoom adjustment range R2 of the lighting lens 151, based on the location p2 of the optical lens. In the case of FIG. 3B, the lighting lens 151 may move only within the zoom adjustment range R2 to adjust brightness of an image.

Referring to FIG. 4, in the case where the lighting lens 151 is located at a right end, that is, an extreme location in the −X direction, of the zoom adjustment range R2, a diffusion range 310b of light from the lighting unit 150 may coincide with an angle of view 210b. In the case where the lighting lens 151 is located at a left end, that is, an extreme location in the +X direction, of the zoom adjustment range R2, the diffusion range 320 of light from the lighting unit 150 may be wider than the angle of view 210b. As a diffusion range of light approaches the angle of view 210b, brightness of an image may increase, and as the diffusion range of light becomes larger than the angle of view 210b, brightness of an image may be reduced.

In this case, as described above, the minimum diffusion ranges 310a and 310b of light may be determined by the controller 110, and may be determined based on ranges corresponding to the angle of views 210a and 210b of the optical unit 140. That is, the controller 110 may determine the zoom adjustment range such that the ranges corresponding to the angle of views 210a and 210b become the minimum diffusion ranges 310a and 310b of the diffusion range of light.

The maximum diffusion range 320 of light may be originated from a structure of the lighting unit 150, and may be constant despite a change of the angle of views 210a and 210b.

The controller 110 according to an example embodiment may adjust zoom of the lighting unit 150 such that brightness of an image meets a preset condition within the zoom adjustment range (e.g. R1 of FIG. 3A or R2 of FIG. 3B) determined by the above process. The controller 110 according to an example embodiment may adjust a location of the lighting lens 151 of the lighting unit 150 such that brightness of an image meets the preset condition within the zoom adjustment range (e.g. R1 of FIG. 3A or R2 of FIG. 3B).

Figure 5A:
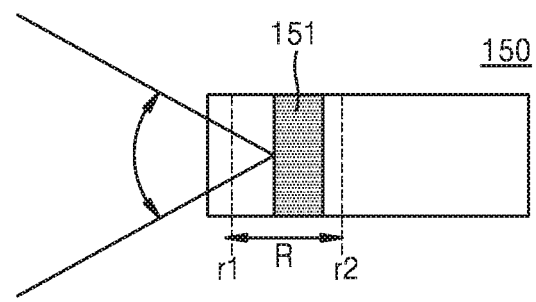
FIG. 5A, FIG. 5B, and FIG. 5C are views to illustrate a process in which a controller adjusts zoom of a lighting unit according to an example embodiment.
Figure 5B:
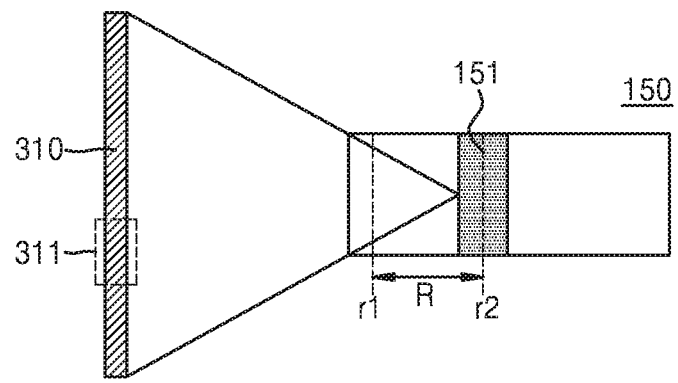
Figure 5C:
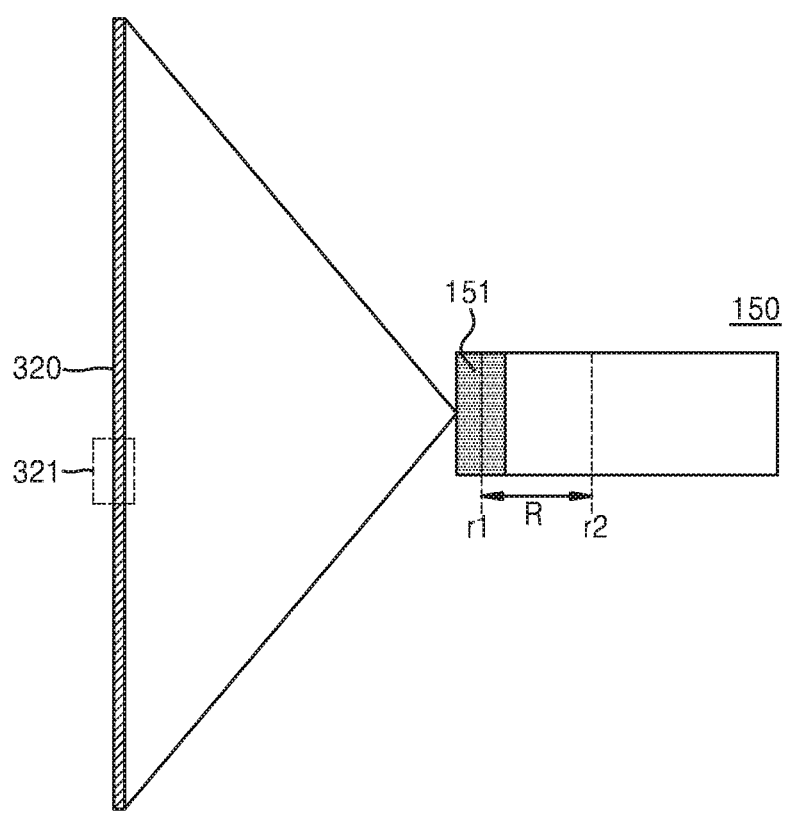

FIGS. 5A, 5B, and 5C are views to illustrate a process in which the controller 110 adjusts zoom of the lighting unit 150 according to an example embodiment.

Referring to FIGS. 5A, 5B, and 5C, the lighting unit 150 may include the lighting lens 151 configured to adjust a diffusion range of light, a diffusion range of light from the lighting unit 150 may be adjusted depending on a location of the lighting lens 151, and zoom adjustment of the lighting unit 150 may be based on movement of the lighting lens 151.

Referring to FIGS. 5A, 5B, and 5C, the controller 110 according to an example embodiment may adjust zoom of the lighting unit 150 such that brightness of an image meets a preset condition within a zoom adjustment range R.

For example, as illustrated in FIG. 5B, the controller 110 may reduce a diffusion range of light by moving the lighting lens 151 to a location r2 corresponding to a minimum diffusion range 310 of light within the zoom adjustment range R, and thus, increase brightness of an image by increasing intensity of the light per unit area 311.

Also, as illustrated in FIG. 5C, the controller 110 may increase a diffusion range of light by moving the lighting lens 151 to a location r1 corresponding to a maximum diffusion range 320 of light within the zoom adjustment range R, and thus, reduce brightness of an image by reducing intensity of the light per unit area 321.

The controller 110 according to an example embodiment may determine whether brightness of an image meets the preset condition while adjusting zoom of the lighting unit 150 by moving a location of the lighting lens 151 in a direction from r2 to r1, such that the diffusion range of light gradually increases from the minimum diffusion range 310 to the maximum diffusion range 320, and an intensity of light per unit area decreases.

When the brightness of the image meets the preset condition during the adjustment the location of the lighting lens 151 from r2 to r1, the controller 110 may stop the zoom adjustment of the lighting unit 150.

Therefore, the lighting controller 100 according to an example embodiment may allow the optical unit 140 to obtain an image having a predetermined brightness.

The preset condition to be met to stop the zoom adjustment of the lighting unit 150 may be a condition in which brightness of an image is equal to or higher than a preset minimum brightness and equal to or less than a preset maximum brightness. In this case, the preset minimum brightness and the preset maximum brightness may be set depending on an environment under which the lighting controller 100 according to an example embodiment is installed.

The controller 110 according to an example embodiment may adjust zoom of the lighting unit 150 such that a diffusion range of light coincides with a range corresponding to an angle of view or optical zoom magnification of the optical unit 140 before adjusting the zoom of the lighting unit 150 according to FIGS. 5A, 5B, and 5C.

In other words, the controller 110 according to an example embodiment may initially adjust the zoom of the lighting unit 150 such that the diffusion range of light coincides with the angle of view or the optical zoom magnification of the optical unit 140, and then, perform zoom adjustment of the lighting unit 150 according to FIGS. 5A, 5B, and 5C while gradually extending the diffusion range of light, and reducing intensity of light per unit area.

In the case where brightness of an image obtained through the optical unit 140 is less than the preset minimum brightness when the zoom of the lighting unit 150 has been adjusted such that the diffusion range of light coincides with the range corresponding to an angle of view or optical zoom magnification of the optical unit 140, the controller 110 according to an example embodiment may control the lighting unit 150 such that the brightness of light emitted from the lighting unit 150 increases. For example, the controller 110 may control the lighting unit 150 such that power supplied to the lighting unit 150 increases, or control the lighting unit 150 such that power supplied to at least one second lighting unit adjacent to the lighting unit 150 increases.

Therefore, according to example embodiments an image having a predetermined brightness may be obtained under various environments.

Figure 6:
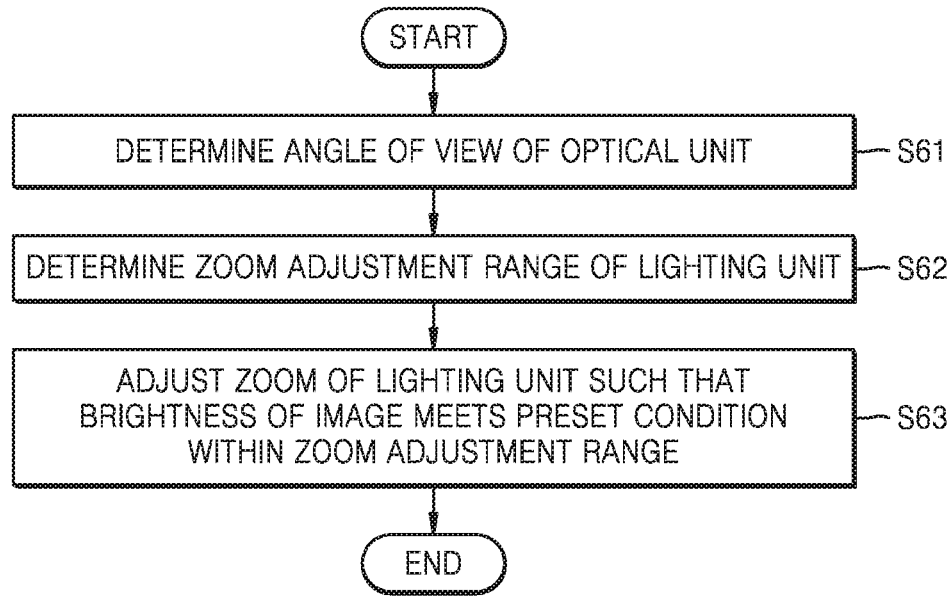
FIG. 6 and FIG. 7 are flowcharts to illustrate a lighting control method performed by a lighting controller according to an example embodiment.
Figure 7:
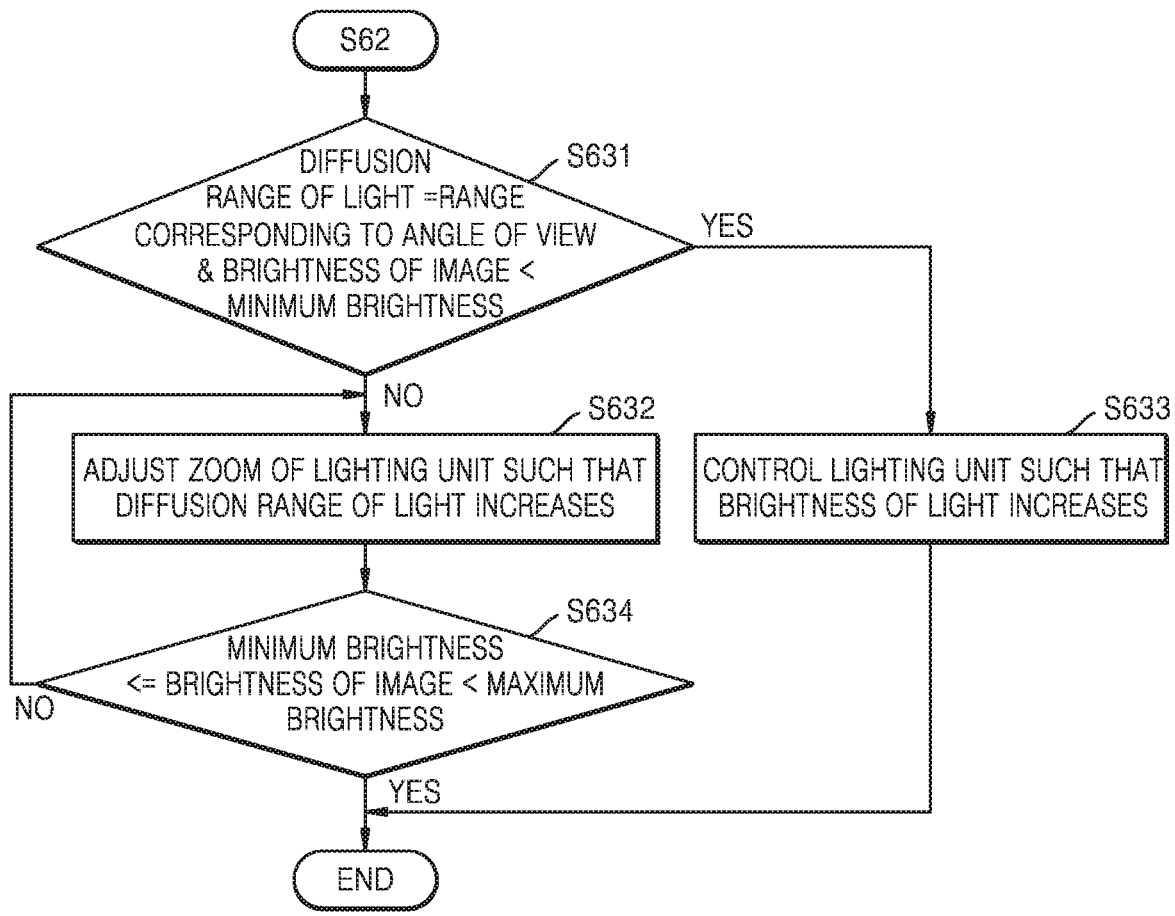

FIGS. 6 and 7 are flowcharts to illustrate a lighting control method performed by the lighting controller 100 according to an example embodiment.

The lighting controller 100 according to an example embodiment may determine an angle of view of the optical unit 140 (S61).

Referring to FIG. 2, an angle of view 210 may be a range of a scene which may be obtained through the optical unit 140 of the lighting controller 100. Therefore, a wide angle of view may be a wider range of a scene which may be obtained by the optical unit 140, while a narrow angle of view may be a narrower range of a scene which may be obtained by the optical unit 140.

The angle of view may be determined based on a location of at least one lens among a plurality of lenses included in the optical unit 140. The lighting controller 100 according to an example embodiment may determine a location of the at least one lens among the plurality of lenses included in the optical unit 140, and determine an angle of view of the optical unit 140 based on the location of the at least one lens. In this case, corresponding information of an angle of view for each location of the lens may be obtained in advance and stored in the memory 120.

The lighting controller 100 according to an example embodiment may determine the location of the at least one lens among the plurality of lenses included in the optical unit 140, and determine optical zoom magnification of the optical unit 140 based on the location of the at least one lens. In this case, the optical zoom magnification may be a ratio by which an image obtained by a lens of the optical unit 140 is enlarged. In this case, corresponding information of optical zoom magnification for each location of a lens may be obtained in advance and stored in the memory 120.

The lighting controller 100 according to an example embodiment may determine an angle of view based on various information generated by the optical unit 140 as well as a lens of the optical unit 140. For example, the lighting controller 100 may determine an angle of view based on information regarding driving of a motor included in the optical unit 140, the information being generated by the optical unit 140. However, this is exemplary and example embodiments are not limited thereto.

Subsequently, the lighting controller 100 according to an example embodiment may determine a zoom adjustment range of the lighting unit 150 with reference to at least one of the angle of view and the optical zoom magnification of the optical unit 140 determined by the above process (S62). In more detail, the lighting controller 100 according to an example embodiment may determine a location of at least one optical lens included in the optical unit 140, and determine the zoom adjustment range of the lighting unit 150 based on the location of at least one optical lens. In this case, the lighting controller 100 according to an example embodiment may determine the zoom adjustment range such that a range corresponding to at least one of the angle of view and the optical zoom magnification of the optical unit 140 becomes a minimum diffusion range of light.

Referring to FIGS. 3A, 3B, and 4, a process in which the lighting controller 100 according to an example embodiment determines the zoom adjustment range of the lighting unit 150 is described.

Referring to FIGS. 3A, 3B, and 4, at least one of the angle of view and the optical zoom magnification of the optical unit 140 may change depending on a location of the optical lens 141. Also, the lighting unit 150 may include the lighting lens 151 configured to adjust the diffusion range of light, and the diffusion range of light of the lighting unit 150 may be adjusted depending on a location of the lighting lens 151, that is, zoom adjustment of the lighting unit 150 may be based on movement of the lighting lens 151. Lastly, light emitted from the lighting unit 150 may be emitted in the +X direction, and the optical unit 140 may obtain an image from the +X direction.

Referring to FIG. 3A, the lighting controller 100 according to an example embodiment may determine a location p1 of the optical lens 141 included in the optical unit 140, and determine a zoom adjustment range R1 of the lighting unit 150, that is, the zoom adjustment range R1 of the lighting lens 151, based on the location p1 of the optical lens 141. In other words, in the case of FIG. 3A, the lighting lens 151 may move only within the zoom adjustment range R1 to adjust brightness of an image.

Referring to FIG. 4, in the case where the lighting lens 151 is located at a right end, that is, an extreme location in the −X direction, of the zoom adjustment range R1, a diffusion range brightness of an image is equal to or higher than a preset minimum brightness and equal to or less than a preset maximum brightness of light from the lighting unit 150 may coincide with an angle of view 210a. In the case where the lighting lens 151 is located at a left end, that is, an extreme location in the +X direction, of the zoom adjustment range R1, a diffusion range 320 of light from the lighting unit 150 may be wider than the angle of view 210a. As the diffusion range of light approaches the angle of view 210a, brightness of an image may increase, and as the diffusion range of light becomes larger than the angle of view 210a, brightness of an image may be reduced.

Referring to FIG. 3B, the lighting controller 100 according to an example embodiment may determine a location p2 of the optical lens 141 included in the optical unit 140, and determine a zoom adjustment range R2 of the lighting unit 150, that is, the zoom adjustment range R2 of the lighting lens 151, based on the location p2 of the optical lens. In the case of FIG. 3B, the lighting lens 151 may move only within the zoom adjustment range R2 to adjust brightness of an image.

Referring to FIG. 4, in the case where the lighting lens 151 is located at a right end, that is, an extreme location in a −X direction, of the zoom adjustment range R2, a diffusion range 310b of light from the lighting unit 150 may coincide with an angle of view 210b. In the case where the lighting lens 151 is located at a left end, that is, an extreme location in the +X direction, of the zoom adjustment range R2, the diffusion range 320 of light from the lighting unit 150 may be wider than the angle of view 210b. As a diffusion range of light approaches the angle of view 210b, brightness of an image may increase, and as the diffusion range of light becomes larger than the angle of view 210b, brightness of an image may be reduced.

In this case, as described above, the minimum diffusion ranges 310a and 310b of light may be determined by the lighting controller 100, and may be determined based on ranges corresponding to the angle of views 210a and 210b of the optical unit 140. That is, the lighting controller 100 may determine the zoom adjustment range such that the ranges corresponding to the angle of views 210a and 210b become the minimum diffusion ranges 310a and 310b of the diffusion range of light.

The maximum diffusion range 320 of light may be originated from a structure of the lighting unit 150, and may be constant despite a change of the angle of views 210a and 210b.

The lighting controller 100 according to an example embodiment may adjust zoom of the lighting unit 150 such that brightness of an image meets a preset condition within the zoom adjustment range (e.g. R1 of FIG. 3A or R2 of FIG. 3B) determined by the above process (S63). In other words, the lighting controller 100 according to an example embodiment may adjust a location of the lighting lens 151 or the lighting unit 150 such that brightness of an image meets the preset condition within the zoom adjustment range (e.g. R1 of FIG. 3A or R2 of FIG. 3B).

First, the lighting controller 100 according to an example embodiment may determine whether brightness of an image obtained by the optical unit 140 is less than preset minimum brightness when the diffusion range of light coincides with the range corresponding to the angle of view or the optical zoom magnification of the optical unit 140 (S631).

If brightness of an image obtained by the optical unit 140 is less than the preset minimum brightness, the lighting controller 100 according to an example embodiment may control the lighting unit 150 such that brightness of light from the lighting unit 150 increases (S633). For example, the lighting controller 100 may control the lighting unit 150 such that power supplied to the lighting unit 150 increases, or control the lighting unit 150 such that power supplied to at least one second lighting unit adjacent to the lighting unit 150 increases.

When brightness of an image obtained by the optical unit 140 is the preset minimum brightness or more, the lighting controller 100 according to an example embodiment may adjust zoom of the lighting unit 150 such that the diffusion range of light increases (S632), and repeatedly perform the determining of whether the brightness of the image meets the preset condition (S634).

Referring to FIGS. 5A, 5B, and 5C, a process in which the lighting controller 100 adjusts zoom of the lighting unit 150 according to an example embodiment is described in detail.

Referring to FIGS. 5A, 5B, and 5C, the lighting unit 150 may include the lighting lens 151 configured to adjust a diffusion range of light, and a diffusion range of light from the lighting unit 150 may be adjusted depending on a location of the lighting lens 151. Also, zoom adjustment of the lighting unit 150 may be based on movement of the lighting lens 151.

Referring to FIGS. 5A, 5B, and 5C, the lighting controller 100 according to an example embodiment may adjust zoom of the lighting unit 150 such that brightness of an image meets a preset condition within a zoom adjustment range R.

For example, the lighting controller 100 according to an example embodiment may determine whether brightness of an image meets the preset condition while adjusting zoom of the lighting unit 150 by moving a location of the lighting lens 151 in a direction from r2 to r1, such that the diffusion range of light gradually extends from the minimum diffusion range 310 to the maximum diffusion range 320, and an intensity of light per unit area is decreases.

When the brightness of the image meets the preset condition during the adjustment of the location of the lighting lens 151 from r2 to r1, the lighting controller 100 may stop the zoom adjustment of the lighting unit 150.

Therefore, the lighting controller 100 according to an example embodiment may allow the optical unit 140 to obtain an image having a predetermined brightness.

The preset condition which stops the zoom adjustment of the lighting unit 150 may be a condition in which brightness of an image is equal to or higher than a preset minimum brightness and equal to or less than a preset maximum brightness. In this case, the minimum brightness and the maximum brightness may be set variously depending on an environment under which the lighting controller 100 according to an example embodiment is installed.

The lighting controller 100 according to an example embodiment may adjust zoom of the lighting unit 150 such that a diffusion range of light coincides with a range corresponding to an angle of view or optical zoom magnification of the optical unit 140 before performing operation S631. The lighting controller 100 according to an example embodiment may initially adjust the zoom of the lighting unit 150 such that the diffusion range of light coincides with the angle of view or the optical zoom magnification of the optical unit 140, and then, perform zoom adjustment of the lighting unit 150 corresponding to operations S632 and S634 while gradually increasing the diffusion range of light, while reducing the intensity of light per unit area.

Therefore, according to example embodiments, an image having a predetermined brightness may be obtained under various environments.

Hereinafter, a method in which the controller 110 controls zoom of the lighting unit 150 based on an angle of view and brightness of an image is described.

The controller 110 according to an example embodiment may determine a first zoom value of the lighting unit 150 with reference to an angle of view of the optical unit 140. Also, the controller 110 according to an example embodiment may determine a second zoom value of the lighting unit 150 such that brightness of an image meets a preset condition with reference to the first zoom value determined by the above process.

Figure 8A:
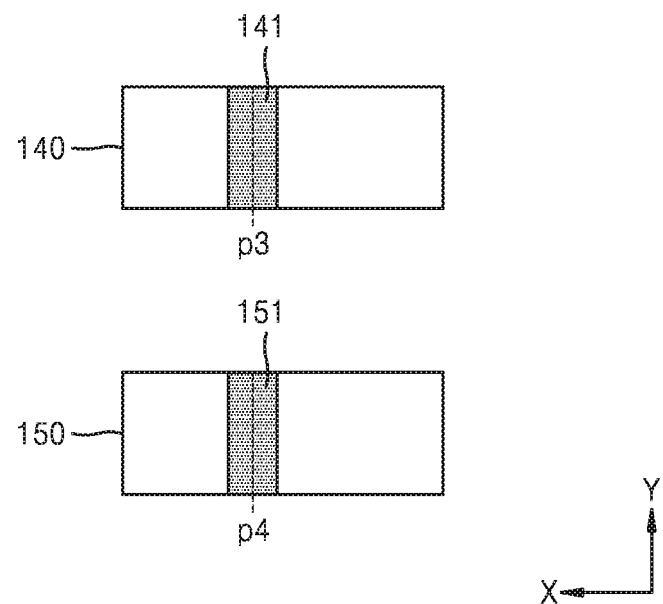
FIG. 8A and FIG. 8B are views to illustrate a process in which a controller determines a first zoom value and a second zoom value according to an example embodiment.
Figure 8B:
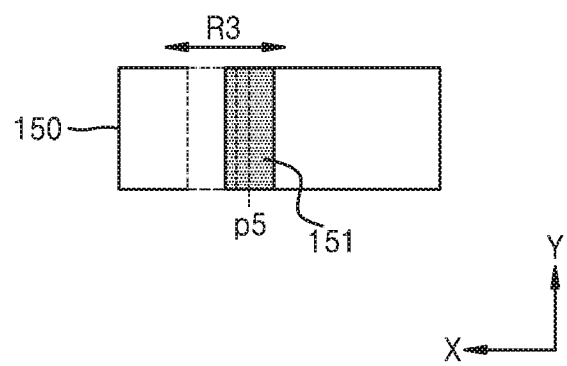

FIGS. 8A and 8B are views to illustrate a process in which the controller 110 determines a first zoom value and a second zoom value according to an example embodiment.

Light from the lighting unit 150 may be emitted in the +X direction, and the optical unit 140 may obtain an image from the +X direction.

Referring to FIGS. 8A and 8B, the controller 110 according to an example embodiment may determine the first zoom value of the lighting unit 150 with reference to an angle of view of the optical unit 140.

As described with reference to FIG. 2, according to an example embodiment, an angle of view may be a range of a scene which may be obtained by the optical unit 140 of the lighting controller 100, and may be determined based on a location of at least one lens among the plurality of lenses included in the optical unit 140.

The controller 110 according to an example embodiment may determine a location p3 of the at least one lens among the plurality of lenses included in the optical unit 140, and determine an angle of view of the optical unit 140 based on the location p3 of the at least one lens. In this case, corresponding information of an angle of view for each location of the lens may be obtained in advance and stored in the memory 120.

According to an example embodiment, zoom values such as the first zoom value and the second zoom value may be values corresponding to locations of the lighting lens 151 of the lighting unit 150. For example, if a zoom value is larger, it may indicate that the lighting lens 151 has moved in the +X direction inside the lighting unit 150. If a zoom value is smaller, it may indicate that the lighting lens 151 has moved in the −X direction inside the lighting unit 150. However, this is exemplary and example embodiments are not limited thereto.

As described above, the controller 110 according to an example embodiment may determine a location p3 of the optical lens 141, and determine the first zoom value of the lighting unit 150 based on the location p3 of the optical lens 141. In this case, corresponding information of the first zoom value for each location of the optical lens 141 may be obtained in advance and stored in the memory 120.

Subsequently, the controller 110 according to an example embodiment may adjust zoom of the lighting unit 150 based on the first zoom value determined by the above process. The controller 110 according to an example embodiment may move a location of the lighting lens 151 to a preset location p4 based on the first zoom value.

The controller 110 according to an example embodiment may determine the second zoom value of the lighting unit 150 such that brightness of an image meets a preset condition with reference to the first zoom value determined by the above process.

For example, the controller 110 may determine whether brightness of an image meets the preset condition when zoom of the lighting unit 150 is adjusted based on the first zoom value, that is, when the location of the lighting lens 151 is moved to the preset location p4 based on the first zoom value.

In this case, the preset condition may be a condition in which brightness of an image is equal to or higher than a preset minimum brightness, and equal to or less than a preset maximum brightness as described with reference to FIGS. 5A, 5B, and 5C. In this case, the preset minimum brightness and the preset maximum brightness may be set depending on an environment under which the lighting controller 100 according to an example embodiment is installed.

Subsequently, the controller 110 according to an example embodiment may determine one of zoom values in the vicinity R3 of the first zoom value determined by the above process as the second zoom value based on the determination result of whether the brightness of the image meets the preset condition.

In this case, the controller 110 according to an example embodiment may determine the second zoom value while moving a location of the lighting lens 151 according to the process described with reference to FIGS. 5B and 5C. In other words, the controller 110 according to an example embodiment may determine whether the brightness of the image meets the preset condition while adjusting zoom of the lighting unit 150, while moving a location of the lighting lens 151 in the +X direction, such that the diffusion range of light gradually increases and the intensity of light per unit area is decreases.

Also, the controller 110 according to an example embodiment may determine whether the brightness of the image meets the preset condition while adjusting zoom of the lighting unit 150, while moving a location of the lighting lens 151 in the −X direction, such that the diffusion range of light gradually decreases and such that an intensity of light per unit area increases.

In this case, a start location, a location of the lighting lens 151 when starting to determine the second zoom value of the lighting unit 150 such that brightness of an image meets the preset condition, of the lighting lens 151 may be a location p4 of the lighting lens 151 determined based on the first zoom value.

Also, a location p5 of the lighting lens 151 when the brightness of the image meets the preset condition may be a location corresponding to the second zoom value.

As described above, the controller 110 according to an example embodiment may adjust zoom of the lighting unit 150 more quickly and more precisely by moving zoom of the lighting unit 150 based on the first zoom value determined based on an angle of view of an image, and determining the second zoom value based on brightness of the image.

Figure 9:
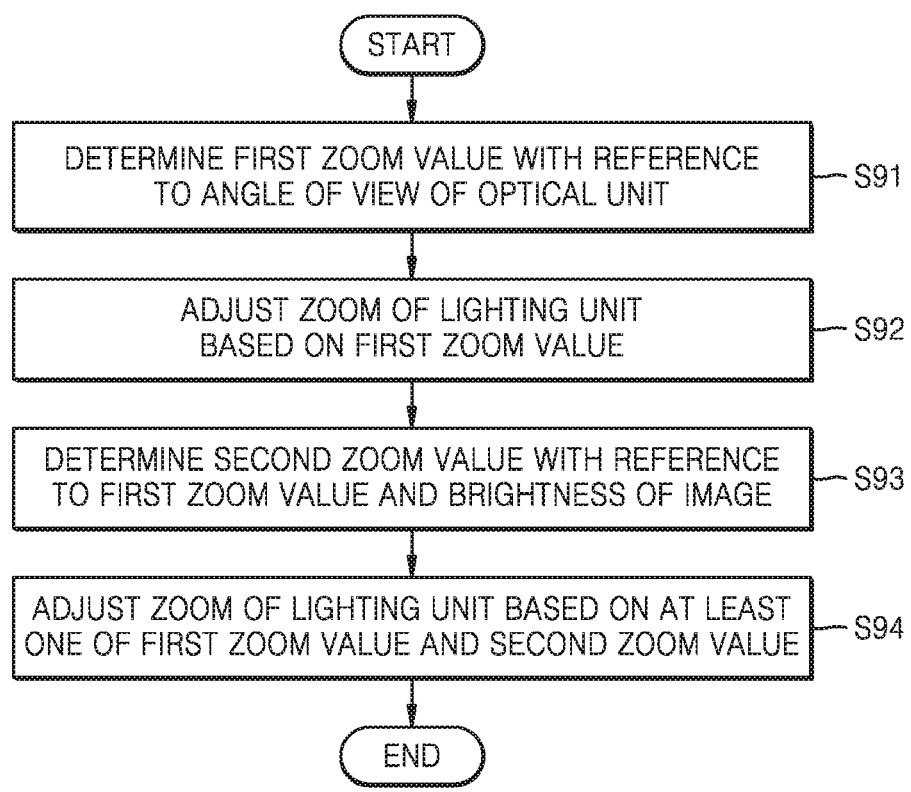
FIG. 9 is a flowchart to illustrate a method of controlling, by a lighting controller, zoom of a lighting unit based on an angle of view of an image and brightness of the image according to an example embodiment.

FIG. 9 is a flowchart to illustrate a method of controlling, by the lighting controller 100, zoom of the lighting unit 150 based on an angle of view of an image and brightness of the image according to an example embodiment with reference to FIGS. 8A and 8B.

The lighting controller 100 according to an example embodiment may determine the first zoom value of the lighting unit 150 with reference to an angle of view of the optical unit 140 (S91).

A process in which the lighting controller 100 according to an example embodiment determines the first zoom value and the second zoom value is described with reference to FIGS. 8A and 8B. Light from the lighting unit 150 may be emitted in the +X direction, and the optical unit 140 may obtain an image from the +X direction.

The lighting controller 100 according to an example embodiment may determine the first zoom value of the lighting unit 150 with reference to an angle of view of the optical unit 140.

As described with reference to FIG. 2, according to an example embodiment, the angle of view may be a range of a scene which may be obtained by the optical unit 140 of the lighting controller 100, and may be determined based on a location of at least one lens among the plurality of lenses included in the optical unit 140.

The lighting controller 100 according to an example embodiment may determine a location p3 of the at least one lens among the plurality of lenses included in the optical unit 140, and determine an angle of view of the optical unit 140 based on the location p3 of the at least one lens. In this case, corresponding information of an angle of view for each location of the lens may be obtained in advance and stored in the memory 120.

According to an example embodiment, zoom values such as the first zoom value and the second zoom value may be values corresponding to locations of the lighting lens 151 of the lighting unit 150. For example, if a zoom value is larger, it may indicate that the lighting lens 151 has moved in the +X direction inside the lighting unit 150. If a zoom value is smaller, it may indicate that the lighting lens 151 has moved in the −X direction inside the lighting unit 150. However, this is exemplary and example embodiments are not limited thereto.

As described above, the lighting controller 100 according to an example embodiment may determine the location p3 of the optical lens 141, and determine the first zoom value of the lighting unit 150 based on the location p3 of the optical lens 141.

Subsequently, the lighting controller 100 according to an example embodiment may adjust zoom of the lighting unit 150 based on the first zoom value determined by the above process (S92). In other words, the lighting controller 100 according to an example embodiment may move a location of the lighting lens 151 to the preset location p4 based on the first zoom value.

The lighting controller 100 according to an example embodiment may determine the second zoom value of the lighting unit 150 such that brightness of an image meets the preset condition with reference to the first zoom value determined by the above process (S93).

For example, the lighting controller 100 may determine whether the brightness of the image meets the preset condition when zoom of the lighting unit 150 is adjusted based on the first zoom value, that is, when a location of the lighting lens 151 is moved to the preset location p4 based on the first zoom value.

In this case, the preset condition may be a condition in which brightness of an image is equal to or higher than a preset minimum brightness, and equal to or less than a preset maximum brightness as described with reference to FIGS. 5A, 5B, and 5C. In this case, the preset minimum brightness and the preset maximum brightness may be set depending on an environment under which the lighting controller 100 according to an example embodiment is installed.

The lighting controller 100 according to an example embodiment may determine one of zoom values in the vicinity R3 of the first zoom value determined by the above process as the second zoom value based on the determination result of whether the brightness of the image meets the preset condition.

In this case, the lighting controller 100 according to an example embodiment may determine the second zoom value while moving a location of the lighting lens 151 according to the process described with reference to FIGS. 5B and 5C (S94). In other words, the lighting controller 100 according to an example embodiment may determine whether the brightness of the image meets the preset condition while adjusting zoom of the lighting unit 150, by moving a location of the lighting lens 151 in the +X direction, such that the diffusion range of light gradually increases and the intensity of light per unit area decreases.

Also, on the contrary, the lighting controller 100 according to an example embodiment may determine whether the brightness of the image meets the preset condition while adjusting zoom of the lighting unit 150, by moving a location of the lighting lens 151 in the −X direction, such that the diffusion range of light gradually decreases and the intensity of light per unit area increases.

In this case, a start location, a location of the lighting lens 151 when starting to determine the second zoom value of the lighting unit 150 such that brightness of an image meets the preset condition, of the lighting lens 151 may be a location p4 of the lighting lens 151 determined based on the first zoom value.

Also, a location p5 of the lighting lens 151 when the brightness of the image meets the preset condition may be a location corresponding to the second zoom value.

As described above, the lighting controller 100 according to an example embodiment may adjust zoom of the lighting unit 150 more quickly and more precisely by moving zoom of the lighting unit 150 based on the first zoom value determined based on an angle of view of an image, and determining the second zoom value based on brightness of the image.

The controller 110 according to an example embodiment may adjust zoom of the lighting unit 150 based on only brightness of an image.

Referring to FIG. 3A, the controller 110 according to an example embodiment may determine whether the brightness of the image meets the preset condition while adjusting zoom of the lighting unit 150, by moving a location of the lighting lens 151 in the +X direction, such that the diffusion range of light gradually increases and the intensity of light per unit area is decreases.

The controller 110 according to an example embodiment may determine whether the brightness of the image meets the preset condition while adjusting zoom of the lighting unit 150, by moving a location of the lighting lens 151 in the −X direction, such that the diffusion range of light gradually decreases and the intensity of light per unit area increases.

Therefore, according to example embodiments, zoom of the lighting unit 150 may be adjusted more efficiently.

The example embodiments may be embodied in the form of computer programs executable through various components on a computer, and the computer program may be recorded on a non-transitory computer-readable recording medium. In this case, examples of the non-transitory computer-readable recording medium include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands. Furthermore, the non-transitory computer-readable recording medium may include an intangible medium embodied in a transmittable form on a network, and may be, for example, a medium embodied in the form of software or an application and transmittable and distributable via a network.

Examples of the computer programs include machine language codes that may be generated by a compiler, and high-level language codes that may be executed by a computer by using an interpreter.

While one or more example embodiments have been described with reference to the figures, it will be understood by one of ordinary skill in the art that various changes in form and details may be made therein without departing from the spirit and scope of the disclosure as defined by the following claims.

What is claimed is:

1. A method of controlling a zoom of a lighting unit, the method comprising:

determining at least one of an angle of view of an optical unit and optical zoom magnification of the optical unit, the optical unit configured to obtain an image by an image sensor;

determining a zoom adjustment range of the lighting unit based on at least one of the angle of view and the optical zoom magnification, wherein the zoom adjustment range is a movable range of the lighting unit within an entire zoom adjustment range of the lighting unit, and is defined by an upper limit and a lower limit; and adjusting the zoom of the lighting unit, within the determined zoom adjustment range, such that brightness of the image meets a preset condition in which the brightness of the image is equal to or higher than a preset minimum brightness and less than a preset maximum brightness, wherein a diffusion range of light emitted from the lighting unit is adjusted based on the adjusted zoom of the lighting unit.

2. The method of claim 1, wherein the determining of the zoom adjustment range further comprises:

determining the zoom adjustment range such that a range corresponding to at least one of the angle of view and the optical zoom magnification is equal to a minimum diffusion range of the diffusion range of the light.

3. The method of claim 2, wherein the adjusting of the zoom further comprises:

determining whether the brightness of the image meets the preset condition while adjusting the zoom of the lighting unit by increasing the diffusion range of the light from the minimum diffusion range.

4. The method of claim 1, further comprising:

before the adjusting of the zoom, adjusting a first zoom of the lighting unit such that the diffusion range of the light is equal to a range corresponding to at least one of the angle of view and the optical zoom magnification.

5. The method of claim 4, wherein the adjusting of the zoom further comprises:

determining whether the brightness of the image is less than the preset minimum brightness when the zoom of the lighting unit is adjusted such that the diffusion range of the light is equal to the range corresponding to the at least one of the angle of view and the optical zoom magnification; and when the brightness of the image is determined to be less than the preset minimum brightness, controlling the lighting unit to increase brightness of light from the lighting unit.

6. The method of claim 5, wherein the controlling of the lighting unit to increase the brightness of light from the lighting unit comprises:

at least one of controlling the lighting unit to increase power supplied to the lighting unit, and controlling the lighting unit to increase power supplied to at least one second lighting unit adjacent to the lighting unit.

7. The method of claim 1, wherein the determining of the at least one of the angle of view of the optical unit and the optical zoom magnification of the optical unit comprises determining a location of at least one optical lens included in the optical unit, and the determining of the zoom adjustment range comprises determining the zoom adjustment range of the lighting unit based on the location of the at least one optical lens.

8. The method of claim 7, wherein the lighting unit comprises at least one lighting lens configured to adjust the diffusion range of the light, and the determining of the zoom adjustment range further comprises determining a movement range of the lighting unit based on the zoom adjustment range determined based on the location of the at least one optical lens.

9. A non-transitory computer recording medium having recorded thereon a computer program for executing the method of claim 1.

10. A method of controlling a zoom of a lighting unit, the method comprising:

determining a first zoom value of the lighting unit based on an angle of view of an optical unit configured to obtain an image by an image sensor;

determining a second zoom value of the lighting unit such that a brightness of the image is higher than a first preset value, the first preset value being higher than a minimum value of the brightness of the image; and adjusting the zoom of the lighting unit based on at least one of the first zoom value and the second zoom value, wherein a range of adjusting the zoom of the lighting unit is a movable range of the lighting unit within an entire zoom adjustment range of the lighting unit, and is defined by an upper limit and a lower limit, wherein a diffusion range of light emitted from the lighting unit is adjusted corresponding to the adjusted zoom of the lighting unit.

11. The method of claim 10, wherein the determining of the first zoom value comprises:

determining the angle of view of the optical unit based on a location of at least one optical lens included in the optical unit.

12. The method of claim 10, wherein the determining of the second zoom value comprises:

determining whether the brightness of the image obtained by the image sensor is higher than the first preset value.

13. The method of claim 10, wherein the determining of the second zoom value further comprises:

determining whether the brightness of the image is higher than the first preset value when the zoom of the lighting unit is adjusted based on the first zoom value; and determining a zoom value neighboring the first zoom value as the second zoom value based on the determination that the brightness of the image is higher than the first preset value.

14. The method of claim 13, further comprising:

after the determining of the first zoom value, adjusting the zoom of the lighting unit by moving a lighting lens included in the lighting unit from a first position corresponding to the first zoom value.

15. The method of claim 14, further comprises:

determining a second position of the lighting lens based on the determination that the brightness of the image is higher than the first preset value;

determining the second zoom value based on the second position; and adjusting the zoom of the lighting unit based on the determined second zoom value.

16. The method of claim 15, further comprising determining the second zoom value of the lighting unit such that the brightness of the image is less than a second preset value, the second preset value being lower than a maximum value of the brightness of the image.

17. A lighting apparatus comprising:

an optical unit configured to obtain an image and determine at least one of an angle of view of the optical unit and optical zoom magnification of the optical unit;

a controller configured to determine a zoom adjustment range of the lighting apparatus based on at least one of the angle of view and the optical zoom magnification, the zoom adjustment range being at least a portion of an entire zoom adjustment range of the lighting apparatus; and a lighting lens configured to adjust a zoom of the lighting apparatus, within the determined zoom adjustment range, such that brightness of the image meets a preset condition in which the brightness of the image is equal to or higher than a preset minimum brightness and less than a preset maximum brightness, wherein a diffusion range of light emitted from the lighting apparatus is adjusted based on the adjusted zoom of the lighting apparatus, and wherein the determined zoom adjustment range is a movable range of the lighting lens within the entire zoom adjustment range of the lighting apparatus, and is defined by an upper limit and a lower limit.

18. A lighting apparatus comprising:

an optical unit configured to obtain an image and determine at least one of an angle of view of the optical unit and optical zoom magnification of the optical unit;

a controller configured to determine a zoom adjustment range of the lighting apparatus based on at least one of the angle of view and the optical zoom magnification, the zoom adjustment range being at least a portion of an entire zoom adjustment range of the lighting apparatus; and a lighting lens configured to adjust a zoom of the lighting apparatus, within the determined zoom adjustment range, such that brightness of the image meets a preset condition, wherein a diffusion range of light emitted from the lighting apparatus is adjusted based on the adjusted zoom of the lighting apparatus, wherein the controller is further configured to:

determine the zoom adjustment range such that a range corresponding to at least one of the angle of view and the optical zoom magnification is equal to a minimum diffusion range of the diffusion range of the light, and determine whether the brightness of the image meets the preset condition while adjusting the zoom of the lighting apparatus by increasing the diffusion range of the light from the minimum diffusion range.

19. The lighting apparatus of claim 18, wherein the preset condition is a condition in which the brightness of the image is equal to or higher than a preset minimum brightness, and less than a preset maximum brightness.

\* \* \* \* \*